(12) United States Patent
Jia

(10) Patent No.: US 11,888,933 B2
(45) Date of Patent: Jan. 30, 2024

(54) CLOUD SERVICE PROCESSING METHOD AND DEVICE, CLOUD SERVER, CLOUD SERVICE SYSTEM AND STORAGE MEDIUM

(71) Applicant: ZTE CORPORATION, Guangdong (CN)

(72) Inventor: Jia Jia, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 48 days.

(21) Appl. No.: 17/617,626

(22) PCT Filed: Jul. 15, 2020

(86) PCT No.: PCT/CN2020/102073
§ 371 (c)(1),
(2) Date: Dec. 9, 2021

(87) PCT Pub. No.: WO2021/022985
PCT Pub. Date: Feb. 11, 2021

(65) Prior Publication Data
US 2022/0239739 A1    Jul. 28, 2022

(30) Foreign Application Priority Data

Aug. 6, 2019   (CN) .......................... 201910722368.1

(51) Int. Cl.
*H04L 67/1095* (2022.01)
*H04L 41/0859* (2022.01)
(Continued)

(52) U.S. Cl.
CPC ...... *H04L 67/1095* (2013.01); *H04L 41/0863* (2013.01); *H04L 67/1014* (2013.01); *H04L 67/1034* (2013.01); *H04L 67/1097* (2013.01)

(58) Field of Classification Search
CPC . H04L 67/1095; H04L 67/01; H04L 67/1004; H04L 67/1008; H04L 67/101; H04L 67/1012; H04L 67/1014
See application file for complete search history.

(56) References Cited

U.S. PATENT DOCUMENTS

| 10,264,063 B2 | 4/2019 | Wang et al. |
| 2011/0078303 A1* | 3/2011 | Li ....................... H04L 67/1031 718/1 |

(Continued)

FOREIGN PATENT DOCUMENTS

| CN | 104022917 A | 9/2014 |
| CN | 106331150 A | 1/2017 |

(Continued)

OTHER PUBLICATIONS

Chen, Yu-Dong et al, "A Method and Device for Realizing Cloud Server Resource Release or Recovery", Feb. 9, 2017, CN 106844035 (English Translation), pp. 1-16 (Year: 2017).*

(Continued)

*Primary Examiner* — Jonathan A Bui
(74) *Attorney, Agent, or Firm* — Li & Cai Intellectual Property (USA) Office

(57) ABSTRACT

Provided is a cloud service processing method and device, a cloud server, a cloud service system, and a storage medium. The cloud service processing method comprises: at least one cloud server in a system distributes resource information of the at least one cloud server to at least one other cloud server in the system, and receives resource information sent by the at least one other cloud server; the at least one cloud server receives a cloud service request comprising target resource information; and according to the target resource information, the resource information of the at least one cloud server and the resource information of the at least one other cloud server, a target cloud server for (Continued)

performing the cloud service request is determined from the cloud servers included in the system.

18 Claims, 6 Drawing Sheets

(51) Int. Cl.
*H04L 67/1014* (2022.01)
*H04L 67/1034* (2022.01)
*H04L 67/1097* (2022.01)

(56) References Cited

U.S. PATENT DOCUMENTS

| | | | | |
|---|---|---|---|---|
| 2014/0139614 | A1* | 5/2014 | Swanson | H04N 7/152 |
| | | | | 348/14.08 |
| 2015/0178117 | A1* | 6/2015 | Ryu | G06F 9/5005 |
| | | | | 718/1 |
| 2015/0341280 | A1* | 11/2015 | Wang | H04L 67/02 |
| | | | | 709/225 |
| 2017/0048159 | A1* | 2/2017 | Mäenpää | G06F 9/5055 |
| 2017/0097941 | A1* | 4/2017 | Graves, Jr. | H04L 69/40 |
| 2017/0289060 | A1 | 10/2017 | Aftab et al. | |
| 2017/0318121 | A1* | 11/2017 | Miller | H04L 67/563 |
| 2019/0028538 | A1* | 1/2019 | Chen | H04L 67/1034 |
| 2019/0042659 | A1* | 2/2019 | Jin | G06F 3/0617 |
| 2020/0065149 | A1* | 2/2020 | Clow | G06F 9/5072 |

FOREIGN PATENT DOCUMENTS

| | | |
|---|---|---|
| KR | 20120128827 A | 11/2012 |
| KR | 20140117714 A | 10/2014 |
| WO | WO 2018153218 A1 | 8/2018 |

OTHER PUBLICATIONS

WIPO, International Search Report dated Sep. 16, 2020.
China Patent Office, CN201910722368.1 First Office Action dated May 25, 2023.
European Patent Office, EP20849999.6 Extended European Search Report dated Aug. 9, 2023.

* cited by examiner

CLOUD SERVICE PROCESSING METHOD AND DEVICE, CLOUD SERVER, CLOUD SERVICE SYSTEM AND STORAGE MEDIUM

The present application is a National Stage of International Application No. PCT/CN2020/102073, filed on Jul. 15, 2020, which claims priority to Chinese Patent Application No. 201910722368.1 filed on Aug. 6, 2019, in Chinese Patent Office, both of which are incorporated by reference herein in their entireties.

TECHNICAL FIELD

The present disclosure relates to the field of communications.

BACKGROUND

With continuous development and maturity of cloud computing technology, more and more enterprises will consider building a cloud service system. A cloud service transfers computing resources from local to a cloud end, uploads complex and heavy computing tasks to the cloud end, releases the local computing resources and has more computing selectivity. The cloud service currently exists in two forms, namely public cloud and private cloud.

In existing technology, regardless of a public cloud product or a private cloud product, in the architecture of a cloud server system, each cloud server serving as a cloud service node undertakes its own role in the cloud service system, resource information of each cloud server is separately managed independently, each cloud server realizes a corresponding function by using its own resource information, and a functional architecture relationship between each cloud server needs to be specially considered during arrangement and development of system architecture, but workload for the arrangement and the development is heavy and complicated, and errors are easy to occur. When a cloud service request is received, the cloud service request should be executed by a specific cloud server of the system, if this cloud server is abnormal or fails or is in a state such as unavailable, upgrading or the like, the whole cloud service system may be abnormal, and all data of the cloud server need to be migrated to a new cloud server which normally runs, thereby causing poor stability, disaster tolerance and flexibility are poor, and high maintenance costs.

SUMMARY

One aspect of an embodiment of the present disclosure provides a cloud service processing method including performing resource management and performing service processing. Performing the resource management includes distributing, by at least one cloud server in a system, resource information of the at least one cloud server to at least one other cloud server in the system, and receiving resource information sent by the at least one other cloud server. Executing the service processing includes receiving, by the at least one cloud server, a cloud service request including target resource information; and determining a target cloud server for executing the cloud service request from cloud servers included in the system according to the target resource information, the resource information of the at least one cloud server and the resource information of the at least one other cloud server.

Another aspect of the embodiment of the present disclosure provides a cloud service processing device applied to at least one cloud server in a system, including: a resource managing module configured to distribute resource information of the at least one cloud server to at least one other cloud server in the system and receive resource information sent by the at least one other cloud server; and a service processing module configured to receive a cloud service request including target resource information, and determine a target cloud server for executing the cloud service request from cloud servers included in the system according to the target resource information, the resource information of the at least one cloud server, and the resource information of the at least one other cloud server.

Another aspect of the embodiment of the present disclosure provides a cloud server including a processor, a memory, and a communication bus. The communication bus is configured to enable a communication connection between the processor and the memory; and the processor is configured to execute a computer program stored in the memory to implement at least one step of the cloud service processing method according to the embodiment of the present disclosure.

Another aspect of the embodiment of the present disclosure provides a cloud service system, which includes at least two cloud servers as described above, and the at least two cloud servers are communicatively connected to each other.

Another aspect of the embodiment of the present disclosure provides a computer-readable storage medium on which a computer program is stored, the computer program being executable by a processor to implement at least one step of the cloud service processing method according to the embodiment of the present disclosure.

Additional features and corresponding advantages of the present disclosure are set forth in the description which follows, and it is understood that at least some of the advantages will be apparent from the description in the present disclosure.

DETAILED DESCRIPTION

In order to make purposes, technical solutions and advantages of the present disclosure more clearly understood, following detailed description of the embodiment of the present disclosure is made with reference to accompanying drawings. It should be understood that the specific embodiment described herein is merely illustrative of the present disclosure and does not limit the present disclosure.

With respect to problem of poor stability, disaster tolerance and flexibility and high maintenance costs of a cloud service system in the existing technology. A cloud service processing method according to the embodiment of the present disclosure can realize that resource information on each cloud server in the system is equipotent, reduce workload and complexity for arrangement and development of system architecture, and realize light arrangement and light development, and when a cloud server is abnormal or fails, another cloud server capable of replacing the cloud server can be determined to replace the cloud server, thus the system is better in stability, reliability, disaster tolerance and flexibility, more flexible in maintenance and lower in maintenance costs, and compared with the cloud service system in the existing technology, the system achieves light migration and light operation and maintenance, and is better in elasticity.

The cloud service processing method according to the embodiment of the present disclosure may include a resource management process and a service processing process, where it should be understood that, when the resource management and the service processing are being executed, there may be a intersecting (i.e., parallelly executing) time point in time, and there also may not be the intersecting time point.

Figure 1:
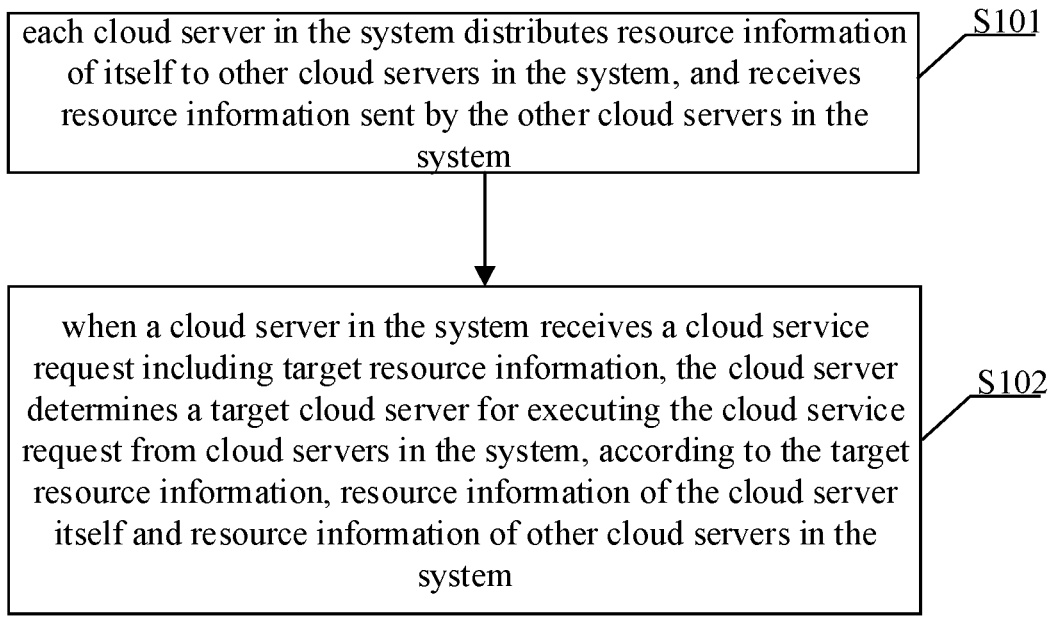
FIG. 1 is a flowchart of a cloud service processing method according to the embodiment of the present disclosure.

As shown in FIG. 1, which is an exemplary flowchart of a cloud service processing method according to the embodiment of the present disclosure, the method includes step S101 and step S102.

In step S101, a resource management process is performed. The resource management in a system may include that each cloud server in the system distributes resource information of itself to other cloud servers in the system and receives resource information sent by the other cloud servers in the system.

The system in the embodiment of the present disclosure may refer to a cloud service system, and the system may be a public cloud system, a private cloud system (which may be disposed in a private LAN at this time), or a combination of the public cloud system and the private cloud system.

Figure 2:
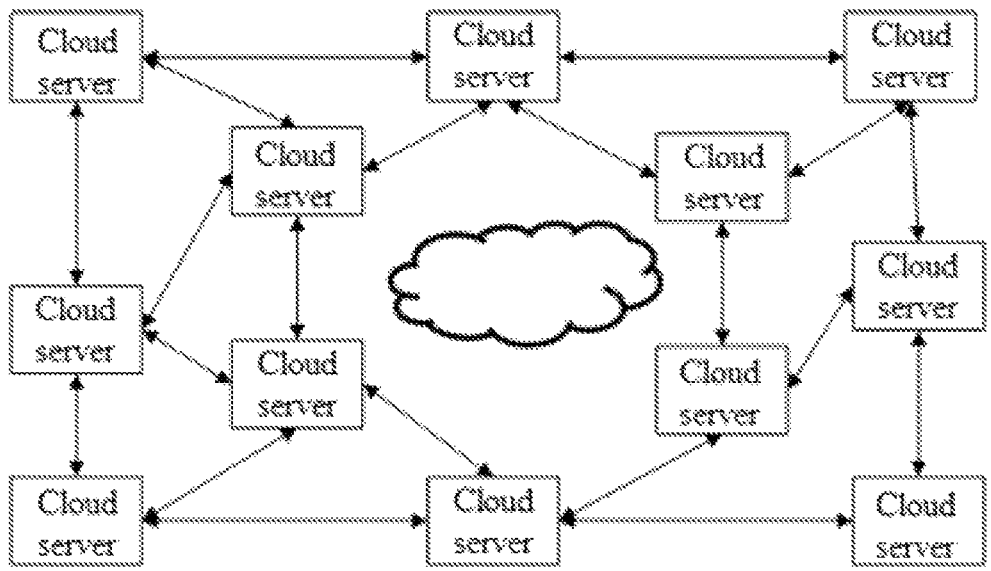
FIG. 2 is a schematic structural diagram of a cloud service system according to the embodiment of the present disclosure.

The system in the embodiment of the disclosure may include at least two cloud servers having communication connection there between (one cloud server is used as one node in the system). FIG. 2 is a schematic diagram illustrating an exemplary structure of a cloud service system according to the embodiment of the present disclosure. It should be understood that in some examples of the embodiment of the present disclosure, a hardware resource configuration of each cloud server in the cloud service system may be set to be the same. In other examples of the embodiment of the present disclosure, it may also be set that the hardware resource configuration of each cloud server in the cloud service system are diversified, and the diversified resource configurations of the servers may adapt to different service requirements, so as to maximize resource utilization and meet the requirement of flexible configuration. Which setting is specifically adopted can be flexibly set according to a requirement of a specific application scenario.

According to the embodiment according to the present disclosure, through the step S101, each cloud server in the cloud service system learns the resource information of itself as well as the resource information of other cloud servers in the system, so that the resource information on each cloud server in the cloud service system is equipotent, the workload and the complexity for the arrangement and the deployment of the system architecture can be reduced, and light arrangement and light development can be realized.

In addition, it should be understood that in the embodiment of the present disclosure, the resource information distributed by each cloud server to other cloud servers and the resource information sent by other cloud servers in the system received by each cloud server may include at least one of any resource information that can implement and provide the cloud service, and specifically, which resource information is included may be flexibly selected and set according to the specific application scenario.

According to the embodiment according to the present disclosure, a protocol and an information interaction format adopted by interaction of the resource information between the cloud servers can be flexibly set. For example, in some examples of the embodiment of the present disclosure, HTTP (Hyper Text Transfer Protocol), SOAP (Simple Object Access Protocol), SSH (Secure Shell Protocol), or the like may be employed, but the present disclosure is not limit thereto.

In step S102, service processing is performed. The service processing in the system may include that when a cloud server in the system receives a cloud service request including target resource information, the cloud server determines a target cloud server executing the cloud service request from cloud servers in the system according to the target resource information, the resource information of the cloud server itself and the resource information of other cloud servers in the system.

In some examples of the embodiment of the present disclosure, one cloud service request may be sent to each cloud server in the system, and each cloud server may determine the target cloud server executing the cloud service request according to the target resource information in the cloud server, the resource information of the cloud server itself, and the resource information of other cloud servers in the system. When different target cloud servers are determined, a final target cloud server can be selected by negotiating through a corresponding negotiation mechanism or a corresponding selection mechanism.

In some examples of the disclosed embodiment, one cloud service request may be sent to each cloud server or a designated part of cloud servers in the system, and then at least one cloud server existing in the system and corresponding to or matching the cloud service request determines the target cloud server executing the cloud service request from the cloud servers in the system, according to the target resource information, the resource information of the cloud server itself and the resource information of other cloud servers in the system. When a plurality of cloud servers has determined different target cloud servers, the final target cloud server can be selected by negotiating through the corresponding negotiation mechanism or the corresponding selection mechanism.

In some examples of the embodiment of the present disclosure, one cloud service request may be sent to each cloud server in the system or at least one preset master cloud server serving as a master, and then the at least one preset master cloud server determines the target cloud server executing the cloud service request from the cloud servers in the system, according to the target resource information, the resource information of the master cloud server itself and the resource information of other cloud servers in the system. When a plurality of master cloud servers has determined different target cloud servers, the final target cloud server can be selected by negotiating through the corresponding negotiation mechanism or the corresponding selection mechanism.

It should be understood that, an algorithm of determining the target cloud server executing the cloud service request from the cloud servers in the system by the cloud server according to the target resource information specified in the cloud service request, the resource information of the cloud server itself, and the resource information of other cloud servers in the system in the embodiment of the present disclosure may be flexibly selected according to the specific application scenario. For example, a regression algorithm, a deep learning algorithm, a machine learning algorithm, an empirical algorithm, and/or a K-means clustering algorithm may be employed, but the present disclosure is not limited thereto. The determined target cloud server in the embodiment of the present disclosure is used as a cloud service working node for executing the cloud service request. In some application scenarios, the determined target cloud server may further include a cloud server serving as a standby cloud service working node, and when the cloud service working node is abnormal, the cloud service working node may be replaced by the standby cloud service working node, so that normal execution of the cloud service is ensured.

It can be seen that in the cloud service system provided in the embodiment of the present disclosure, when a certain cloud server is abnormal or fails, another cloud server capable of replacing the certain cloud server can be determined by other cloud servers for replacement, and increase, decrease, and upgrade of some cloud servers can be simply and flexibly implemented without affecting normal operation of the system.

In the embodiment of the present disclosure, the resource information distributed by each cloud server to other cloud servers and the resource information sent by other cloud servers in the system received by each cloud server may include at least one of any resource information that can implement and provide the cloud service. For convenience of understanding, the embodiment of the present disclosure will be described below by taking several kinds of specific resource information and distributing processes of the resource information as examples.

In some examples of the embodiment of the present disclosure, distributing the resource information to other cloud servers in the system and receiving the resource information sent by other cloud servers in the system by the cloud server in the system may include that the cloud server in the system performs mirror processing on initial resource configuration information of itself to obtain a resource configuration mirror file, distributes the resource configuration mirror file to other cloud servers in the system, and receives resource configuration mirror files sent by other cloud servers in the system.

In some examples of the embodiment of the present disclosure, the distributing may be performed in a form of, but not limited to, a binary mirror, and the resource configuration information may include, but is not limited to, at least one of a computational resource, a storage resource, a network resource, or a user resource.

According to the embodiment provided by the present disclosure, on the basis of the above examples, distributing the resource information to other cloud servers in the system and receiving the resource information sent by other cloud servers in the system by the cloud server in the system may further include that when resource configuration of the cloud server itself in the system changes, the cloud server performs the mirror processing on the changed resource configuration to obtain the resource configuration mirror file, and distributes the resource configuration mirror file to other cloud servers in the system.

In some examples of the embodiment of the present disclosure, the change in the resource configuration of the cloud server may include at least one of a change in static hardware resource configuration (for example, increase/decrease of a storage hard disk, increase of a memory, or the like) or a change in a resource occupation situation (for example, resource releasing which has been executed by a service, or a new service to be executed, or the like).

In some examples of the disclosed embodiment, the resource configuration mirror file may include, but is not limited to, resource configuration identification information (for example, a resource configuration identifier may be set to identify a mirror file as the resource configuration mirror file), cloud server identification information (for example, a cloud server address or any other information capable of uniquely identifying a cloud server), cloud server status information (for detecting a working status of a cloud server), resource configuration status identification information (for identifying which resource configuration is, for example, initial resource configuration information, or identifying the resource configuration information after which resource was changed), resource information (for example, a statically configured resource or a dynamically configured resource), and resource configuration associated index information. The resource configuration associated index information may include the resource configuration status identification information in other resource configuration mirror files associated with a resource configuration mirror file where the resource configuration associated index information is located. For example, in one example, a backward association may be provided, i.e., one or more previous resource configuration mirror files are associated. An exemplary resource configuration format is shown in Table 1.

TABLE 1

| Included contents | Explanation of its function |
| --- | --- |
| Resource configuration identifier | For identifying whether a file is the resource configuration information |
| Cloud server address | For identifying a cloud server |
| Hash value | Serving as the resource configuration status identification information for identifying change of a resource |
| Cloud server status information | For detecting a working status of a server |
| Statically configured resource | Such as a processor, a memory, an internal storage, a network card, or the like |
| Dynamically configured resource | Such as memory usage, storage spare space, procedure number, network data, or the like |
| Backward index | Backward resource configuration mirror file index |

According to the embodiment provided by the present disclosure, on the basis of the above examples, the resource management of the cloud server may further include but is not limited to at least one of the following: when detecting resource configuration abnormity or illegal invasion, the cloud server in the system issues alarm information and/or sends a resource configuration rollback instruction or a resource configuration unloading instruction to other cloud servers in the system; when receiving a cloud service revocation request, the cloud server in the system sends the resource configuration unloading instruction to other cloud servers in the system; or when receiving a resource configuration rollback request (for example, resource rollback is required after a certain service is executed), the cloud server sends the resource configuration rollback instruction to other cloud servers in the system. The resource configuration rollback instruction may include target resource configuration status identification information to which rollback is required. For example, it is assumed that a certain cloud server has 5 resource configuration mirror files, hash values in the 5 resource configuration mirror files are a hash value 1 to a hash value 5, the hash value 1 corresponds to initial resource configuration, and the hash value 2 to the hash value 5 correspond to 2nd to 5th resource configuration changes respectively, when the cloud server needs rollback, the resource configuration rollback instruction may include any one of the hash values 1 to 4 (for example, the hash value 2 is included, that is, the hash value 2 is used as the target resource configuration status identification information) according to a specific application scenario, and at this time, after receiving the instruction, other cloud servers may delete resource configuration mirror files corresponding to the hash values 3, 4, and 5 of the cloud server, so as to implement the rollback for the resource configuration of the cloud server.

According to the embodiment provided by the disclosure, when the cloud server receives the resource configuration unloading instruction, all resource configuration information corresponding to the cloud server who sent the resource configuration unloading instruction can be deleted or marked as invalid.

In some examples of the embodiment of the present disclosure, the distributed resource information may include, in addition to the resource configuration information, data information of the cloud server according to a requirement, and at this time, distributing the resource information to other cloud servers in the system and receiving the resource information sent by other cloud servers in the system by the cloud server in the system may further include that the cloud server in the system performs the mirror processing on initial data information of itself to obtain a data mirror file, distributes the data mirror file to other cloud servers in the system, and receives data mirror files sent by other cloud servers in the system.

It should be understood that, in some examples of the embodiment of the present disclosure, at least some cloud servers in the system may not distribute the data mirror file to other cloud servers, which may be flexibly set according to an actual requirement.

According to the embodiment provided by the present disclosure, on the basis of the above examples, distributing the resource information to other cloud servers in the system and receiving the resource information sent by other cloud servers in the system by the cloud server in the system may further include that when data of the cloud server itself in the system changes (for example, data changes due to new computed data generated during a process of executing a service or data releasing after the service has been executed), the cloud server perform the mirror processing on the changed data to obtain the data mirror file, and distributes the data mirror file to other cloud servers in the system.

In some examples of the embodiment of the present disclosure, the data mirror file may include, but is not limited to, data mirror identification information (for example, a data mirror identifier may be set to identify the mirror file as the data mirror file), cloud server identification information (for example, a cloud server address or any other information capable of uniquely identifying a cloud server), cloud server status information (for detecting a working status of a cloud server), data status identification information (for identifying which data mirror is, for example, initial data information, or identifying the data mirror information after which data was changed), user configuration data, authority configuration data, file system type, data type, data node, data mirror associated index information. The data mirror associated index information may include the data status identification information in other data mirror files associated with the data mirror file where the data mirror associated index information is located. For example, in one example, a backward association may be provided, i.e., one or more previous data mirror files are associated. An exemplary data mirror format is shown in Table 2.

TABLE 2

| Included contents | Explanation of its function |
| --- | --- |
| Data mirror identifier | For identifying whether a file is the data mirror file |
| Cloud server address | For identifying a cloud server |
| Hash value | Serving as the data status identification information for identifying change of data |
| Cloud server status information | For detecting a working status of a server |
| User configuration list | For managing user data of a cloud server |
| Authority configuration list | For managing user authority of a cloud server |
| File system type | Such as Ext 4, FAT32, NTFS or the like |
| Data type | Physical data or virtual data |
| Data node | File system data node |
| Backward index | Backward resource configuration mirror file index |

According to the embodiment provided by the present disclosure, on the basis of the above examples, the resource management of the cloud server may further include but is not limited to at least one of the following: when detecting resource configuration abnormity or illegally invasion, the cloud server in the system issues alarm information and/or sends a data rollback instruction or a data deleting instruction to other cloud servers in the system; when receiving a cloud service revocation request, the cloud server in the system sends the data deleting instruction to other cloud servers in the system; or when receiving a data rollback request, the cloud server in the system sending the data rollback instruction to other cloud servers in the system.

The data rollback instruction may include target data status identification information to which rollback is required. For example, it is assumed that a certain cloud server has 3 data mirror files, hash values in the 3 data mirror files are a hash value 11 to a hash value 13, the hash value 11 corresponds to initial data mirror, and the hash value 12 and the hash value 13 correspond to the 2nd and 3rd data changes respectively, when the cloud server needs data rollback, the data rollback instruction may include any one of the hash values 11 or 12 (for example, the hash value 12 is included, that is, the hash value 12 is used as the target data status identification information) according to a specific application scenario, and at this time, after receiving the instruction, other cloud servers may delete the data mirror file corresponding to the hash value 13 of the cloud server, so as to implement rollback of the data mirror file of the cloud server.

In some examples of the embodiment of the present disclosure, when the cloud server receives the data deleting instruction, all data mirror files corresponding to the cloud server who sent the data deleting instruction may be deleted or marked as invalid.

That is, according to the embodiment according to the present disclosure, based on the distributing and sharing of the resource configuration information and the data information between cloud servers in the system, a rollback process may be performed on resource configuration or data mirror of a certain cloud server when needed, thereby reducing migration quantity and improving resource utilization. For the resource configuration and the data mirror in each status of a certain cloud server, a corresponding relationship as shown in Table 3 may be formed, so as to facilitate a subsequent rollback process.

TABLE 3

| Hash value | Corresponding resource configuration or data mirror |
| --- | --- |
| Hash pointer 1 | Pointing to the initial resource configuration |
| Hash pointer 2 | Pointing to resource configuration changed firstly |
| Hash pointer 3 | Pointing to the initial data mirror |
| . . . | . . . |
| Hash pointer N | Pointing to resource configuration or data mirror changed at Nth times |

It should be understood that an application environment of the cloud service system shown in the foregoing examples of the embodiment of the present disclosure may be a single-region multi-machine environment or a cross-region and cross-network environment, and may meet an application computing requirement of an enterprise for local and cross-region services.

In some application scenarios, the cloud service system exemplified by each example above may be deployed in an enterprise private LAN, the resource configuration and the data mirror of the cloud server may be monitored in real-time, the resource configuration and data security may be monitored and early-warned, a unloading or rollback process may be performed on the resource configuration after abnormity, and a deleting or rollback process may be performed on the data mirror, so that loss is reduced to the minimum, security, stability, and flexibility of the system may be improved, system maintenance costs may be reduced, and light arrangement, light development, light migration, and light working and maintenance of the cloud server system may be achieved.

Figures 3, 4:
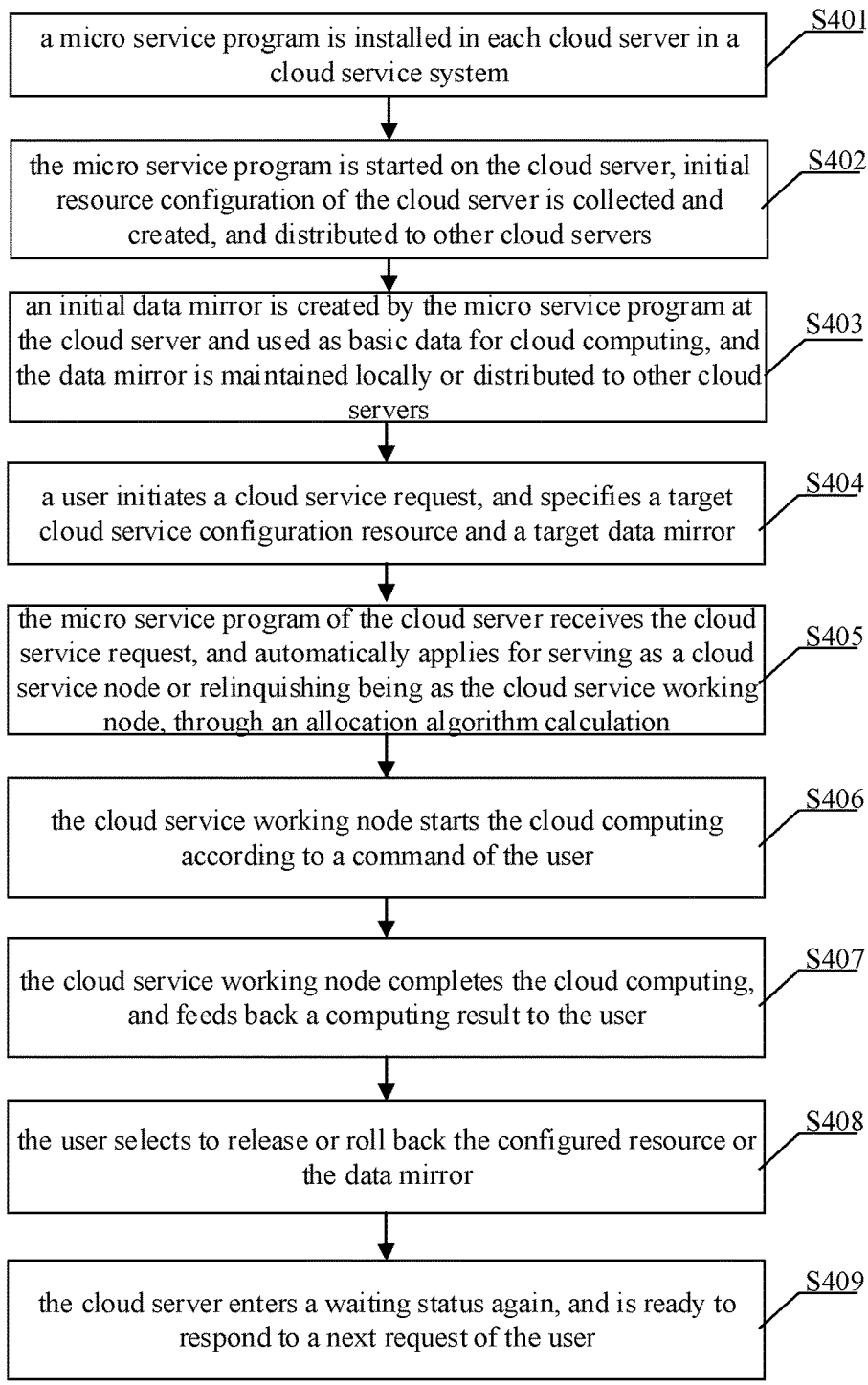
FIG. 3 is a schematic structural diagram of a cloud service processing device according to the embodiment of the present disclosure.
FIG. 4 is another flowchart of a cloud service processing method according to the embodiment of the present disclosure.

The embodiment of the present disclosure also provides a cloud service processing device, which can be disposed in the cloud server. As shown in FIG. 3, it is a schematic structural diagram of a cloud service processing device according to the embodiment of the present disclosure, the cloud service processing device may include a resource managing module 301 and a service processing module 302.

The resource managing module 301 may be configured to distribute resource information of a cloud server where the resource managing module is located to other cloud servers in the system, and receive resource information sent by other cloud servers in the system.

For a specific resource management process, reference is made to the above descriptions of the cloud service processing method in the embodiment of the present disclosure, and details are not described here again.

The service processing module 302 may be configured to, when a cloud service request including target resource information is received, determine a target cloud server executing the cloud service request from cloud servers in the system according to the target resource information, the resource information of itself, and the resource information of other cloud servers in the system.

For a specific service processing process, reference is made to the above descriptions of the cloud service processing method in the embodiment of the present disclosure, and details are not described herein again.

It should be understood that at least one of the resource managing module 301 and the service processing module 302 in the embodiment of the present disclosure may be implemented by, but not limited to, a processor of the cloud server. For example, in an example, a micro service program for implementing functions of the resource managing module 301 and the service processing module 302 may be provided, and the micro service program is called by the processor to implement the functions of the resource managing module 301 and the service processing module 302.

For ease of understanding, the embodiment of the present disclosure is described below as an application example.

In the application example, the cloud service system may include a plurality of cloud servers, and in the application example, the cloud service system may be set to be a master-free server and a master-free database, and distributed resource configuration and data mirror management are adopted, so that a problem that a cloud service is unavailable due to a fact that a certain cloud server and a certain database are abnormal is avoided.

In the application example, resource configuration for the cloud servers in the system may adopt the resource configuration format described in the above related contents of the embodiment of the present disclosure to perform the resource configuration (including a computing resource, a storage resource, a network resource, a user resource, or the like), that is, the resource configuration mirror performs binary mirror making, and after the binary mirror making is completed, the resource configuration mirror is distributed to other work servers through a network protocol of the application example.

In the application example, data mirror for the cloud servers in the system adopts the data mirror format described in the above related contents in the embodiment of the present disclosure to perform the data mirror making. After the data mirror making is completed, the data mirror is distributed to other cloud servers through the network protocol in the application example, or is stored in a local cloud server and used for a subsequent data rollback or deleting operation. A request command format and a command corresponding format of an exemplary network protocol are shown in Tables 4 and 5, respectively.

TABLE 4

| Format | Explanation |
| --- | --- |
| Request command | Uploading or receiving packet command |
| Data packet | Network transmission data packet |
| Target addresses list | Target server specified or unspecified |

TABLE 5

| Format | Explanation |
| --- | --- |
| Command status | Success or failure of uploading or receiving packet command |
| Error information | Detailed error information |

In the application example, each cloud server in the cloud service system deploys a micro service program for implementing the resource management and the service managing described in the above related contents in the embodiment of the present disclosure, including the resource configuration and the data sharing, and selects the cloud server by using an allocation algorithm for distributing data and running a computing task.

In the application example, a retrospective manner design of the above examples may be adopted for all resource configurations and data mirrors of the cloud server. If configuration abnormity, data abnormity or illegal invasion occurs, or in other scenarios needing a rollback process, the resource configuration or data can be quickly rolled back.

In the application example, if the resource configuration or data of the cloud server is changed, an incremental change of the configuration mirror is automatically triggered, and the resource configuration or data is distributed to other servers again.

In the application example, a user may initiate the cloud service request at a certain cloud server (or send the request to all cloud servers), a cloud server that receives the cloud service request analyzes the resource information of all cloud servers, determines a target cloud server array for performing cloud computing of the cloud service request, and triggers the target cloud server to perform the data mirror making, perform related computing, and respond to the user's request.

In the application example, a user cancels a cloud service request at a certain cloud server, and the cloud server can trigger the associated cloud server to perform resource configuration uninstallation and data mirror deletion, and respond to the cloud service cancellation request sent by the user.

FIG. 4 is another flowchart of a cloud service processing method according to the embodiment of the present disclosure, where the cloud service processing method may include steps S401 to S409.

In step S401, a micro service program is installed in each cloud server in a cloud service system.

The micro service program can be resident in the cloud server to run, can be configured to monitor resource change and data change of the cloud server in real time, supports making binary mirrors such as a resource mirror and a data mirror, and supports distributing and receiving resource configurations and data mirrors of other cloud servers.

In step S402, the micro service program is started on the cloud server, and initial resource configuration of the cloud server is collected and created to serve as basic configuration of a cloud server resource, so as to create the resource mirror and distribute the resource mirror to other cloud servers.

In step S403, an initial data mirror is created by the micro service program at the cloud server and used as basic data for cloud computing, and the data mirror is selected to be maintained locally or distributed to other cloud servers according to a requirement.

In step S404, a user initiates a cloud service request, and specifies a target cloud service configuration resource and a target data mirror.

In step S405, the micro service program of the cloud server receives the cloud service request, and automatically applies for serving as a cloud service node (i.e., a target cloud server) or relinquishing being as the cloud service working node, through an allocation algorithm calculation.

In step S406, the cloud service working node starts the cloud computing according to a command of the user.

In step S407, the cloud service working node completes the cloud computing, and feeds back a computing result to the user.

In step S408, the user selects to release or roll back the configured resource or the data mirror.

In step S409, the cloud server enters a waiting status again, and is ready to respond to a next request of the user.

Figure 5:
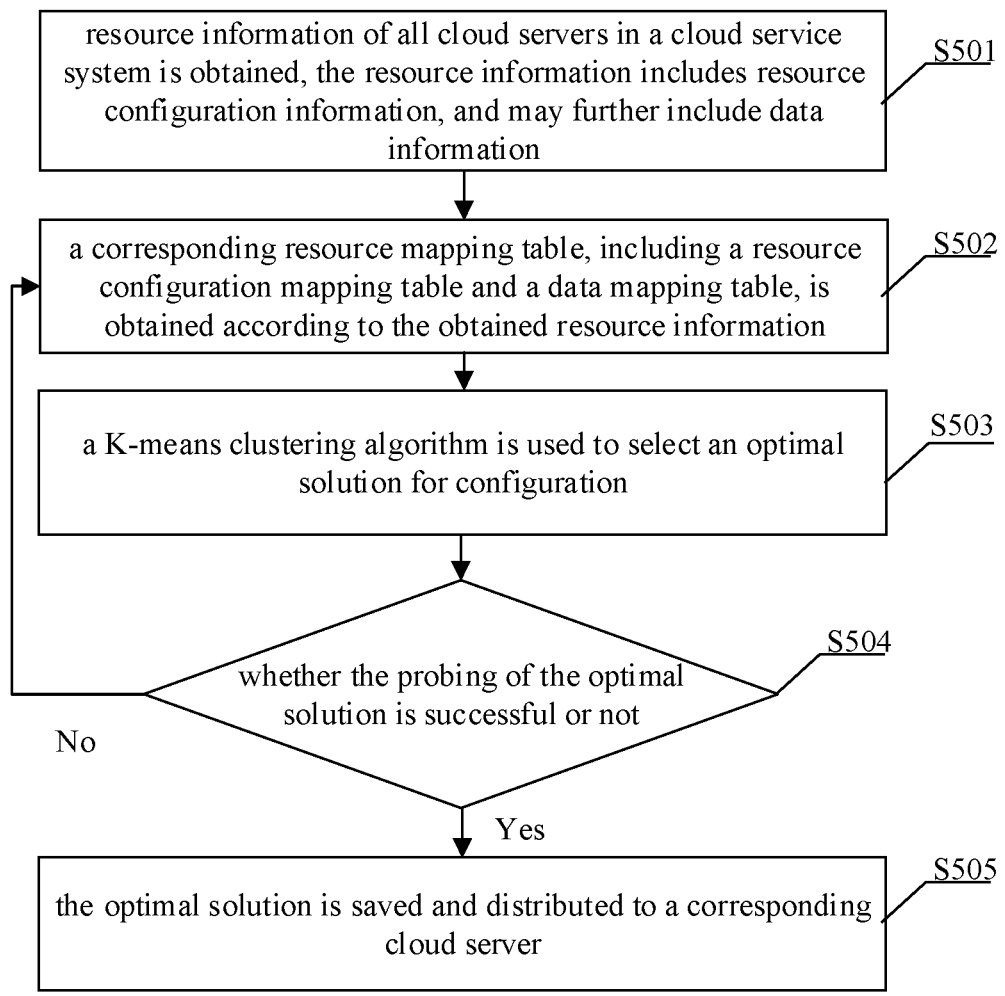
FIG. 5 is a flowchart of a cloud server allocating method according to the embodiment of the present disclosure.

The allocation algorithm in step S405 can be shown in FIG. 5, which is a flowchart of a cloud server allocation method according to the embodiment of the present disclosure, and the allocation method may include steps S501 to S505.

In step S501, the resource information of all cloud servers in the cloud service system is obtained, the resource information includes resource configuration information. In some examples, the resource information may also include data information.

In step S502, a corresponding resource mapping table, including a resource configuration mapping table and a data mapping table, is obtained according to the obtained resource information. An exemplary table format is described above in relation to the embodiment of the present disclosure.

In step S503, a K-means clustering algorithm (a regression algorithm, a deep learning algorithm, a machine learning algorithm, or an empirical algorithm, or the like may also be adopted) is used to select an optimal solution for configuration.

In step S504, the optimal solution for configuration is sent to a corresponding cloud server for probing, and whether the probing is successful is determined, if it is, the method goes to step S505, and if it is not, the method goes to step S502.

In step S505, the optimal solution is saved and distributed to the corresponding cloud server.

Figure 6:
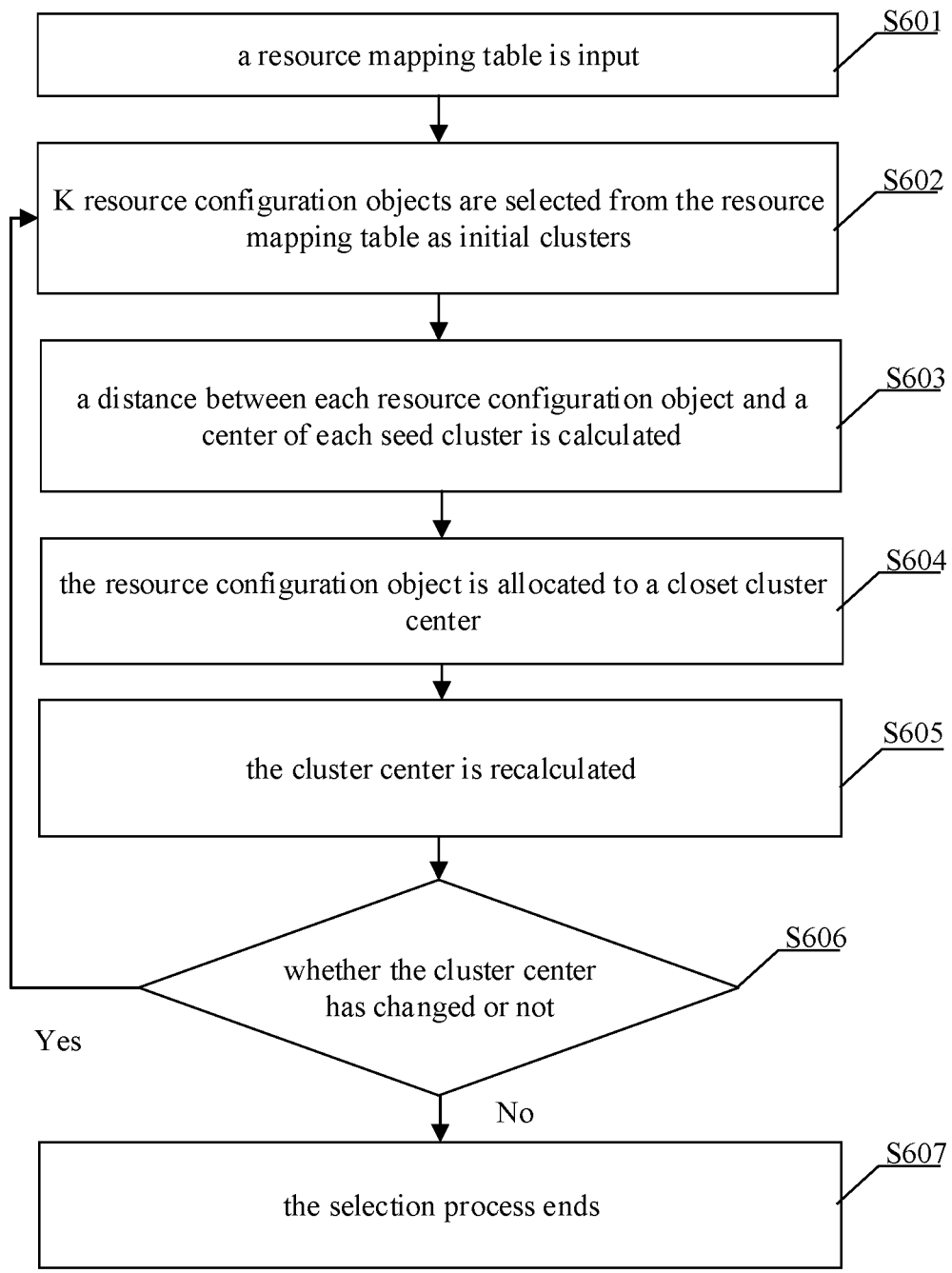
FIG. 6 is a flowchart of a K-means clustering algorithm according to the embodiment of the present disclosure.

FIG. 6 shows an exemplary process of the K-means clustering algorithm in the step S503, and FIG. 6 is a flowchart of the K-means clustering algorithm according to the embodiment of the present disclosure, and the K-means clustering algorithm may include steps S601 to S607.

In step S601, the resource mapping table in step S502 is input.

In step S602, K resource configuration objects are selected from the resource mapping table as initial clusters.

In step S603, a distance between each resource configuration object and a center of each seed cluster is calculated.

In step S604, each resource configuration object is allocated to a closet cluster center.

In step S605, the cluster center is recalculated.

In step S606, it is determined whether the cluster center has changed, if it has, the method goes to step S602, and if it hasn't, the method goes to step S607.

In step S607, the selection process ends.

Figure 7:
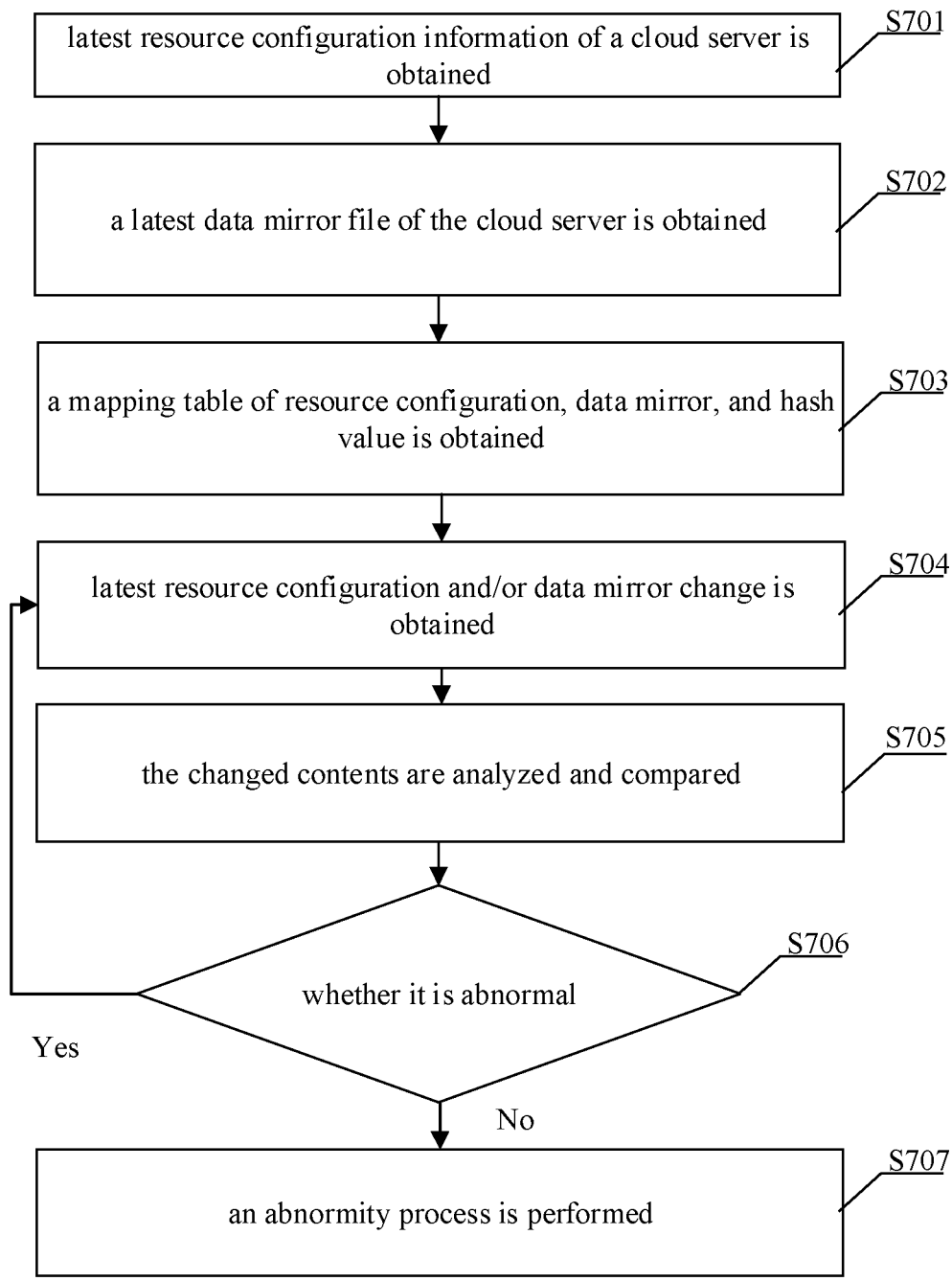
FIG. 7 is a flowchart of an anomaly monitoring method according to the embodiment of the present disclosure.

In an example of the embodiment of the present disclosure, the cloud server may also monitor the resource configuration and/or data in real-time, and a monitoring process of the cloud server may refer to FIG. 7, which is a flowchart of an abnormity monitoring method according to the embodiment of the present disclosure, and the abnormity monitoring method may include step S701 to step S707.

In step S701, latest resource configuration information of the cloud server is obtained.

In step S702, a latest data mirror file of the cloud server is obtained.

In step S703, a mapping table of resource configuration, data mirror, and hash value is obtained.

In step S704, latest resource configuration and/or data mirror change is obtained.

In step S705, the changed contents are analyzed and compared.

In step S706, it is determined whether the resource configuration or the data change is abnormal, if it is, the method goes to step S707, and if it is not, the method goes to step S704.

In step S707, an abnormity process, such as warning, rollback, deleting, or the like, is performed.

Therefore, the cloud service system according to the embodiment of the present disclosure can give consideration to both flexible configuration and data security, so that a user can migrate, arrange, deploy and operate and maintain lightly, a design concept of a micro-service architecture is met, and disaster tolerance and high availability of the cloud service are ensured.

Figure 8:
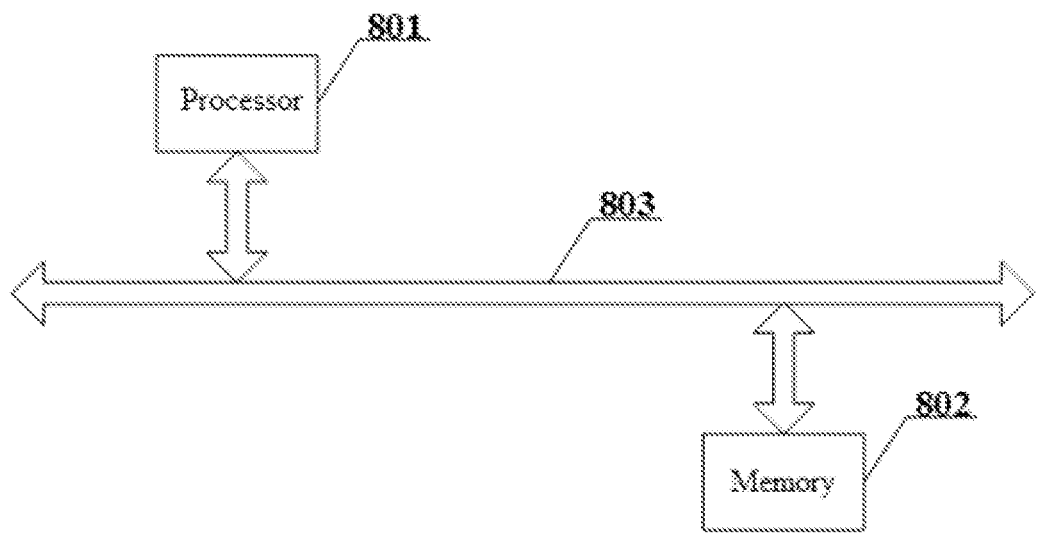
FIG. 8 is a schematic structural diagram of a cloud server according to the embodiment of the present disclosure.

The embodiment of the present disclosure further provides a cloud server, as shown in FIG. 8, which is a schematic structural diagram of the cloud server according to the embodiment of the present disclosure, and the cloud server may include a processor 801, a memory 802, and a communication bus 803.

The communication bus 803 may be configured to enable communication connection between the processor 801 and the memory 802.

According to the embodiment provided by the present disclosure, the processor 801 may be configured to execute a computer program stored in the memory 802 to implement at least one step of the cloud service processing method according to the embodiment of the present disclosure.

The embodiment of the present disclosure further provides a cloud service system, which includes at least two cloud servers according to the embodiment of the disclosure, and the cloud servers are in communication connection with each other.

The embodiment of the present disclosure also provides a computer-readable storage medium including volatile or non-volatile, removable or non-removable medium implemented in any method or technology for storage of information such as a computer-readable instruction, a data structure, a computer program module or other data. The computer-readable storage media include, but are not limited to, RAM (Random Access Memory), ROM (Read-Only Memory), EEPROM (Electrically Erasable Programmable Read Only Memory), flash memory or other memory technology, CD-ROM (Compact disk Read-Only Memory), Digital Versatile Disks (DVD) or other optical disk storage, magnetic cassette, magnetic tape, magnetic disk storage or other magnetic storage devices, or any other medium which can be used to store desired information and which can be accessed by a computer.

The computer-readable storage medium provided by the embodiment of the present disclosure may be used for storing a computer program, which may be executed by a processor to implement at least one step of the cloud service processing method according to the embodiment of the present disclosure.

The embodiment of the present disclosure further provides a computer program (or referred to computer software), which may be distributed on a computer-readable medium and executed by a computing device, so as to implement at least one step of the cloud service processing method according to the embodiment of the present disclosure. In some cases, at least one of the steps shown or described may be performed in an order different than that described in the above embodiment.

The embodiment of the present disclosure also provides a computer program product, which includes a computer-readable device, where any one of the computer programs described above is stored on the computer-readable device.

The computer readable device in the embodiment of the present disclosure may include a computer-readable storage medium as shown above.

It will be apparent to one having skill in the art that all or some of the steps of the methods, functional modules/units in the systems and apparatus disclosed above may be implemented as software (which may be implemented as a computer program code executable by a computing device), firmware, hardware, and suitable combinations thereof In a hardware implementation, division between the functional modules/units mentioned in the above description does not necessarily correspond to division of physical components. For example, one physical component may have multiple functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit.

In addition, as is well known to those having ordinary skill in the art, communication medium typically embodies a computer readable instruction, a data structure, a computer program module or other data in a modulated data signal such as a carrier wave or other transport mechanism and includes any information delivery medium. Thus, the present disclosure is not limited to any specific combination of hardware and software.

The foregoing are detailed descriptions of the embodiment of the present disclosure, taken in conjunction with the specific implements thereof, and it is not intended that the present disclosure be limited to the description. For those having ordinary skill in the technical field to which the present disclosure belongs, without departing from the invention concept of the present disclosure, several simple deductions or substitutions can be made, which should be regarded as falling within the protection scope of the present disclosure.

What is claimed is:

1. A cloud service processing method, comprising:
performing resource management; and
executing service processing,
wherein performing the resource management comprises:
distributing, by at least one cloud server in a system, resource information of the at least one cloud server to at least one other cloud server in the system, and receiving resource information sent by the at least one other cloud server; and
executing the service processing comprises:
receiving, by the at least one cloud server, a cloud service request comprising target resource information; and
determining a target cloud server for executing the cloud service request from cloud servers included in the system, according to the target resource information, the resource information of the at least one cloud server and the resource information of the at least one other cloud server,
wherein distributing, by the at least one cloud server in the system, the resource information of the at least one cloud server to the at least one other cloud server in the system, and receiving the resource information sent by the at least one other cloud server, comprises:
performing, by the at least one cloud server, mirror processing on initial resource configuration information of the at least one cloud server to obtain a first resource configuration mirror file;

distributing, by the at least one cloud server, the first resource configuration mirror file to the at least one other cloud server; and receiving, by the at least one cloud server, a first resource configuration mirror file sent by the at least one other cloud server, wherein each of the first resource configuration mirror files comprise: resource configuration identification information, cloud server identification information, cloud server status information, resource configuration status identification information, resource information, and resource configuration associated index information.

2. The cloud service processing method of claim 1, wherein distributing, by the at least one cloud server in the system, the resource information of the at least one cloud server to the at least one other cloud server in the system, and receiving the resource information sent by the at least one other cloud server, further comprises:

performing, by the at least one cloud server, mirror processing on changed resource configuration to obtain a second resource configuration mirror file, when the resource configuration of the at least one cloud server changes; and distributing the second resource configuration mirror file to the at least one other cloud server;

wherein the change of the resource configuration comprises at least one of a change in static hardware resource configuration or a change in resource occupancy.

3. The cloud service processing method of claim 2, wherein the second resource configuration mirror file comprises: resource configuration identification information, cloud server identification information, cloud server status information, resource configuration status identification information, resource information, and resource configuration associated index information; and resource configuration associated index information included in one resource configuration mirror file comprises: resource configuration status identification information in another resource configuration mirror file associated with the resource configuration mirror file.

4. The cloud service processing method of claim 3, wherein performing the resource management further comprises at least one of:

sending, by the at least one cloud server, alarm information, and/or sending, by the at least one cloud server, a resource configuration rollback instruction or a resource configuration unloading instruction to the at least one other cloud server, when resource configuration abnormity or illegal invasion is detected;

sending, by the at least one cloud server, the resource configuration unloading instruction to the at least one other cloud server, when a cloud service revocation request is received; or sending, by the at least one cloud server, the resource configuration rollback instruction to the at least one other cloud server, when a resource configuration rollback request is received;

wherein the resource configuration rollback instruction comprises target resource configuration status identification information to which rollback is required.

5. The cloud service processing method of claim 1, wherein distributing, by the at least one cloud server in the system, the resource information of the at least one cloud server to the at least one other cloud server in the system, and receiving the resource information sent by the at least one other cloud server, further comprises:

performing, by the at least one cloud server, mirror processing on initial data information of the at least one cloud server to obtain a first data mirror file;

distributing, by the at least one cloud server, the first data mirror file to the at least one other cloud server; and receiving, by the at least one cloud server, a first data mirror file sent by the at least one other cloud server.

6. The cloud service processing method of claim 5, wherein distributing, by the at least one cloud server in the system, the resource information of the at least one cloud server to the at least one other cloud server in the system, and receiving the resource information sent by the at least one other cloud server, further comprises:

performing, by the at least one cloud server, mirror processing on changed data to obtain a second data mirror file, when data of the at least one cloud server changes; and distributing, by the at least one cloud server, the second data mirror file to the at least one other cloud server.

7. The cloud service processing method of claim 6, wherein the first data mirror file and the second data mirror file each comprise: data mirror identification information, cloud server identification information, cloud server status information, data status identification information, user configuration data, authority configuration data, file system type, data node and data mirror associated index information; and data mirror associated index information included in one data mirror file comprises: data status identification information in another data mirror file associated with the data mirror file.

8. The cloud service processing method of claim 7, wherein performing the resource management further comprises at least one of sending, by the at least one cloud server, alarm information, and/or sending, by the at least one cloud server, a data rollback instruction or a data deleting instruction to the at least one other cloud server, when resource configuration abnormity or illegal invasion is detected sending, by the at least one cloud server, the data deleting instruction to the at least one other cloud server, when a cloud service revocation request is received; or sending, by the at least one cloud server, the data rollback instruction to the at least one other cloud service, when a data rollback request is received;

wherein the data rollback instruction comprises target data status identification information to which rollback is required.

9. A cloud server comprising a processor, a memory, and a communication bus, wherein the communication bus is configured to enable a communication connection between the processor and the memory; and the processor is configured to execute a computer program stored in the memory to implement:

distributing resource information of the cloud server to at least one other cloud server in the system, and receiving resource information sent by the at least one other cloud server;

receiving a cloud service request comprising target resource information; and determining a target cloud server for executing the cloud service request from cloud servers included in the system, according to the target resource information, the resource information of the cloud server and the resource information of the at least one other cloud server, wherein the processor is configured to execute the computer program stored in the memory to implement:

performing mirror processing on initial resource configuration information of the cloud server to obtain a first resource configuration mirror file;

distributing the first resource configuration mirror file to the at least one other cloud server; and receiving a first resource configuration mirror file sent by the at least one other cloud server, wherein each of the first resource configuration mirror files comprise: resource configuration identification information, cloud server identification information, cloud server status information, resource configuration status identification information, resource information, and resource configuration associated index information.

10. A cloud service system comprising at least two cloud servers of claim 9, wherein the at least two cloud servers are communicatively connected to each other.

11. A non-transitory computer-readable storage medium on which a computer program is stored, wherein the computer program being executable by a processor to implement at least one step of the cloud service processing method of claim 1.

12. The cloud server of claim 9, wherein the processor is configured to execute the computer program stored in the memory to implement:

performing mirror processing on changed resource configuration to obtain a second resource configuration mirror file, when the resource configuration of the cloud server changes;

and distributing the second resource configuration mirror file to the at least one other cloud server;

wherein the change of the resource configuration comprises at least one of a change in static hardware resource configuration or a change in resource occupancy.

13. The cloud server of claim 12, wherein the second resource configuration mirror file comprises: resource configuration identification information, cloud server identification information, cloud server status information, resource configuration status identification information, resource information, and resource configuration associated index information; and resource configuration associated index information included in one resource configuration mirror file comprises: resource configuration status identification information in another resource configuration mirror file associated with the resource configuration mirror file.

14. The cloud server of claim 13, wherein the processor is configured to execute the computer program stored in the memory to implement at least one of:

sending alarm information, and/or sending a resource configuration rollback instruction or a resource configuration unloading instruction to the at least one other cloud server, when resource configuration abnormity or illegal invasion is detected;

sending the resource configuration unloading instruction to the at least one other cloud server, when a cloud service revocation request is received; or sending the resource configuration rollback instruction to the at least one other cloud server, when a resource configuration rollback request is received;

wherein the resource configuration rollback instruction comprises target resource configuration status identification information to which rollback is required.

15. The cloud server of claim 9, wherein the processor is configured to execute the computer program stored in the memory to implement:

performing mirror processing on initial data information of the cloud server to obtain a first data mirror file;

distributing the first data mirror file to the at least one other cloud server; and receiving a first data mirror file sent by the at least one other cloud server.

16. The cloud server of claim 15, wherein the processor is configured to execute the computer program stored in the memory to implement:

performing mirror processing on changed data to obtain a second data mirror file, when data of the cloud server changes; and distributing the second data mirror file to the at least one other cloud server.

17. The cloud server of claim 16, wherein the first data mirror file and the second data mirror file each comprise: data mirror identification information, cloud server identification information, cloud server status information, data status identification information, user configuration data, authority configuration data, file system type, data node and data mirror associated index information; and data mirror associated index information included in one data mirror file comprises: data status identification information in another data mirror file associated with the data mirror file.

18. The cloud server of claim 17, wherein the processor is configured to execute the computer program stored in the memory to implement at least one of:

sending alarm information, and/or sending a data rollback instruction or a data deleting instruction to the at least one other cloud server, when resource configuration abnormity or illegal invasion is detected sending the data deleting instruction to the at least one other cloud server, when a cloud service revocation request is received; or sending the data rollback instruction to the at least one other cloud service, when a data rollback request is received;

wherein the data rollback instruction comprises target data status identification information to which rollback is required.

* * * * *